United States Patent
Huprikar

(10) Patent No.: US 7,048,265 B2
(45) Date of Patent: *May 23, 2006

(54) TWO STAGE ISOLATION MOUNT ASSEMBLY

(75) Inventor: Anand Huprikar, Novi, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/624,055

(22) Filed: Jul. 21, 2003

(65) Prior Publication Data

US 2005/0017421 A1    Jan. 27, 2005

(51) Int. Cl.
*F16F 7/00* (2006.01)
*F16F 1/36* (2006.01)

(52) U.S. Cl. ............................. 267/141.1; 267/141.3; 267/153; 267/294

(58) Field of Classification Search ............... 267/141, 267/292, 293, 141.2, 141.3, 141.4, 141.7, 267/153, 294, 141.1
See application file for complete search history.

(56) References Cited

U.S. PATENT DOCUMENTS

| | | | | |
|---|---|---|---|---|
| 2,720,374 A | | 10/1955 | Hutton | 248/358 |
| 2,726,081 A | * | 12/1955 | Hunter | 267/293 |
| 3,128,999 A | | 4/1964 | Schmitt | 267/1 |
| 3,350,042 A | | 10/1967 | Stewart et al. | 248/22 |
| 3,479,081 A | | 11/1969 | Schaaf | 296/35 |
| 3,532,319 A | | 10/1970 | Brown | 248/358 |
| 3,622,194 A | | 11/1971 | Bryk | 296/35 R |
| 3,781,058 A | * | 12/1973 | Ziolko et al. | 296/35.1 |
| 3,809,427 A | | 5/1974 | Bennett | 296/35 R |
| 4,218,599 A | | 8/1980 | Garn | 200/159 |
| 4,286,777 A | * | 9/1981 | Brown | 267/141.1 |
| 4,298,193 A | | 11/1981 | Mourray | |
| 4,306,708 A | | 12/1981 | Gassaway et al. | 267/141.3 |
| 4,434,977 A | | 3/1984 | Chiba | |
| 4,462,608 A | | 7/1984 | Lederman | 280/668 |
| 4,478,396 A | | 10/1984 | Kawaura | |
| 4,521,004 A | | 6/1985 | Caldwell | 267/141.4 |
| 4,530,491 A | | 7/1985 | Bucksbee et al. | 267/141 |
| 4,720,075 A | | 1/1988 | Peterson et al. | 248/635 |
| 4,720,086 A | | 1/1988 | Le Salver et al. | 267/140.1 |
| 4,756,516 A | | 7/1988 | Tondato | |
| 4,783,039 A | | 11/1988 | Peterson et al. | 248/635 |

(Continued)

FOREIGN PATENT DOCUMENTS

GB        1132954 A        11/1968

(Continued)

*Primary Examiner*—Thomas Williams
(74) *Attorney, Agent, or Firm*—Fernando A. Borrego

(57) ABSTRACT

A mount assembly having a support structure mounted to a frame of a vehicle and a carrier mounted to a vehicle body. The support structure is displaceable relative to the carrier along a line of travel. An insulator is disposed between the support structure and the carrier for coupling the carrier to the support structure. The insulator has a first portion defining a first resistance for isolating the vibrations of the support structure during an application of a first force along a line of travel. The insulator also has a second portion defining a second resistance with the second resistance being greater than the first resistance for controlling the maximum displacement of the support structure after the application of the first force and during an application of a second force along the line of travel wherein the second force is greater than the first force. The insulator also provides for tunability of the nature and location of the transition between the first resistance and the second resistance.

25 Claims, 4 Drawing Sheets

U.S. PATENT DOCUMENTS

| | | | |
|---|---|---|---|
| 4,798,370 A * | 1/1989 | Inuzuka | 267/220 |
| 4,804,169 A | 2/1989 | Hassan | |
| 4,805,886 A | 2/1989 | Hassan | |
| 4,867,461 A | 9/1989 | Shimmell | 277/166 |
| 5,000,429 A | 3/1991 | Wittmar | |
| 5,158,269 A | 10/1992 | Hein et al. | 267/220 |
| 5,172,999 A | 12/1992 | Ijima et al. | 403/51 |
| 5,178,433 A | 1/1993 | Wagner | 296/35.1 |
| 5,248,134 A | 9/1993 | Ferguson et al. | 267/220 |
| 5,295,671 A | 3/1994 | Nakagaki et al. | 267/140.13 |
| 5,328,141 A | 7/1994 | Dickinson | 248/550 |
| 5,330,166 A | 7/1994 | Aoki | 267/220 |
| 5,388,884 A | 2/1995 | Keehner et al. | 296/190 |
| 5,409,283 A | 4/1995 | Ban | 296/35.1 |
| 5,421,565 A | 6/1995 | Harkrader et al. | 267/220 |
| 5,516,176 A | 5/1996 | Kimoto et al. | 216/35.1 |
| 5,585,413 A | 12/1996 | Nagashima | |
| 5,743,547 A * | 4/1998 | Voss et al. | 280/277 |
| 5,799,930 A | 9/1998 | Willett | 267/141.4 |
| 5,820,115 A | 10/1998 | Stevenson et al. | 267/293 |
| 5,915,775 A | 6/1999 | Martin et al. | 296/35.2 |
| 5,975,505 A | 11/1999 | Yoshimoto | |
| 5,979,884 A | 11/1999 | Sato et al. | 267/140.13 |
| 6,017,073 A * | 1/2000 | Lindblom et al. | 296/35.1 |
| 6,076,794 A | 6/2000 | Pradel | |
| 6,138,980 A | 10/2000 | Farbotnik | 248/638 |
| 6,155,544 A | 12/2000 | Solomond | |
| 6,170,812 B1 | 1/2001 | Nicoles | 267/281 |
| 6,182,953 B1 | 2/2001 | Smith | |
| 6,260,835 B1 | 7/2001 | Angles | |
| 6,276,674 B1 | 8/2001 | Randell | 267/141.4 |
| 6,296,237 B1 | 10/2001 | Nagai | |
| 6,361,096 B1 | 3/2002 | Kim | 296/35.1 |
| 6,364,296 B1 | 4/2002 | Cummings et al. | 267/141.4 |
| 6,394,434 B1 * | 5/2002 | Wolf et al. | 267/141 |
| 6,412,798 B1 | 7/2002 | De Fontenay | |
| 6,416,102 B1 | 7/2002 | Howard | 296/35.1 |
| 6,427,989 B1 | 8/2002 | Hashimoto et al. | 267/141.04 |
| 6,435,489 B1 | 8/2002 | Rice et al. | |
| 6,435,584 B1 | 8/2002 | Bonnville | 296/35.1 |
| 6,485,008 B1 | 11/2002 | Griffin | |
| 6,502,883 B1 * | 1/2003 | Rice | 267/220 |
| 2001/0015537 A1 | 8/2001 | De Fontenay | |
| 2002/0121793 A1 | 9/2002 | Rice | |
| 2005/0012256 A1 * | 1/2005 | Huprikar et al. | 267/141 |

FOREIGN PATENT DOCUMENTS

| | | | |
|---|---|---|---|
| JP | 61045124 A | * | 3/1986 |
| JP | 02309028 A | * | 12/1990 |

* cited by examiner

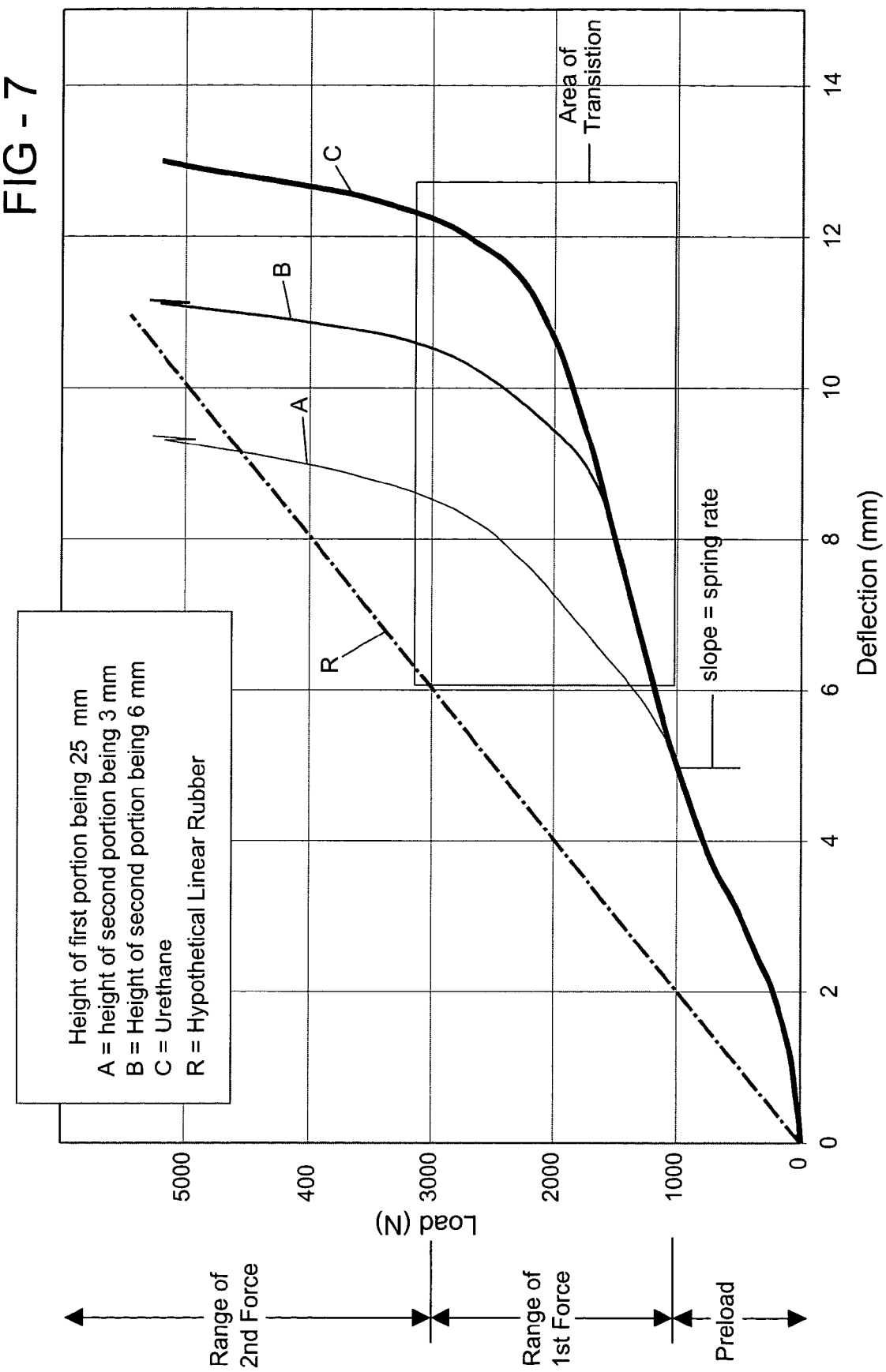

TWO STAGE ISOLATION MOUNT ASSEMBLY

BACKGROUND OF THE INVENTION

1. Field of the Invention

The subject invention relates to a mount assembly for a vehicle having a frame and a vehicle body wherein movements of the frame relative to the vehicle body are isolated and/or translated by an insulator.

2. Description of Related Art

Mount assemblies for vehicles are well known in the art. Examples of such assemblies are shown in U.S. Pat. Nos. 6,361,096 and 6,416,102. Each of these assemblies includes a support structure mounted to a frame and a carrier mounted to a vehicle body. The carrier is coupled to the support structure through one or more insulators. The insulators are typically formed of an elastomeric material such as rubber or microcellular polyurethane (MPU).

Currently the insulators are characterized using a load verses deflection curve. An example of such a curve is shown in FIG. 7. The prior art rubber R and prior art urethane C are illustrated along side the subject invention. The slope of the curve represents the effective spring rate. A lower slope represents a softer spring and a higher slope represents a stiffer or harder spring. Vibrational motion is generally associated with lower forces, amplitudes and higher frequencies and is isolated better with softer springs. Translational motion on other hand is associated with lower frequencies, and larger forces which create maximum displacements. When using linear springs this causes large relative displacement at maxiumum loads. It is desirable to have the insulators operate at lower or softer spring rates to allow for improved isolation of vibrations of the support structure relative to the carrier such that the vehicle body is cushioned on the frame. In order to achieve the desired performance, the insulators are formed of a low modulus material and have a relatively large height. The relatively tall insulators, however, require large clearances between the carrier and the support structure. This also creates an undesirable large displacement between the carrier and the support structure which equates to an undesirable large movement (maximum displacement) between the frame and the vehicle body. Many conventional rubber insulators are a compromise between lower or softer spring rates and maxiumum displacement. In addition, many of the conventional insulators cannot be adequately customized or tuned because of the material and geometrical limitations.

Cylinderical or annular insulators made of mircocellular material can provide the soft spring rate as well as some maximum displacement control. However the total maximum displacement is still too large and the nature and location of the transition from soft to hard spring rate cannot be controlled independent of the properties of polymer. And thus is not easily tunable.

Accordingly, it would be desirable to develop an insulator that is of a reasonable height, takes advantage of a low or soft spring rate, and has low maximum displacement and is easily tunable or customizable.

SUMMARY OF THE INVENTION AND ADVANTAGES

A mount assembly for use with a vehicle having a frame and a vehicle body. The mount assembly comprises a support structure having an aperture and adapted to be mounted to the frame of the vehicle. A carrier is adapted to be mounted to the vehicle body and is at least partially disposed within the aperture with the support structure being displaceable relative to the carrier along a line of travel when the frame moves relative to the vehicle body. An insulator is disposed between the support structure and the carrier for coupling the carrier to the support structure. The insulator has a first portion defining a first resistance for isolating the vibrations of the support structure during an application of a first force along the line of travel in a first direction which at least partially compresses the first portion. The insulator also has a second portion defining a second resistance with the second resistance being greater than the first resistance for controlling the displacement of the support structure after the application of the first force and during an application of a second force along the line of travel in the first direction wherein the second force is greater than the first force such that both of the first and second portions are at least partially compressed.

Accordingly, the subject invention provides an insulator with a dual tunable resistance for both isolating small amplitude vibrations and controlling the displacements. In particular, the first resistance is calibrated to isolate the vibrations between the frame and vehicle body to provide a smooth ride to the vehicle. In addition, the second resistance is calibrated to smoothly translate the intermittent high amplitude movements of the frame and vehicle body and to effectively control maxiumum displacement to maintain the ride control of the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is a graph illustrating an amount of displacement for four different insulators based upon varying loads.

DETAILED DESCRIPTION OF THE INVENTION

Figure 1:
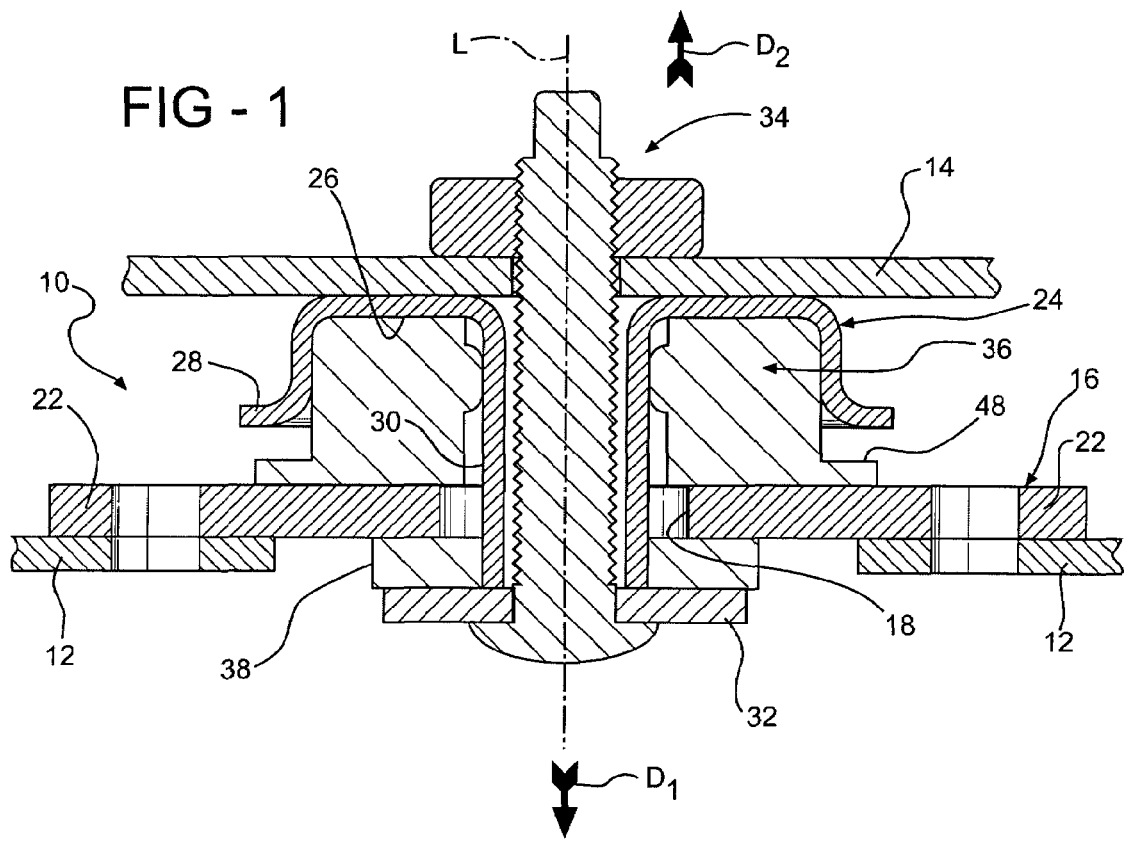
FIG. 1 is a cross-sectional side view of a mount assembly in accordance with the subject invention in a rest state.
Figure 2:
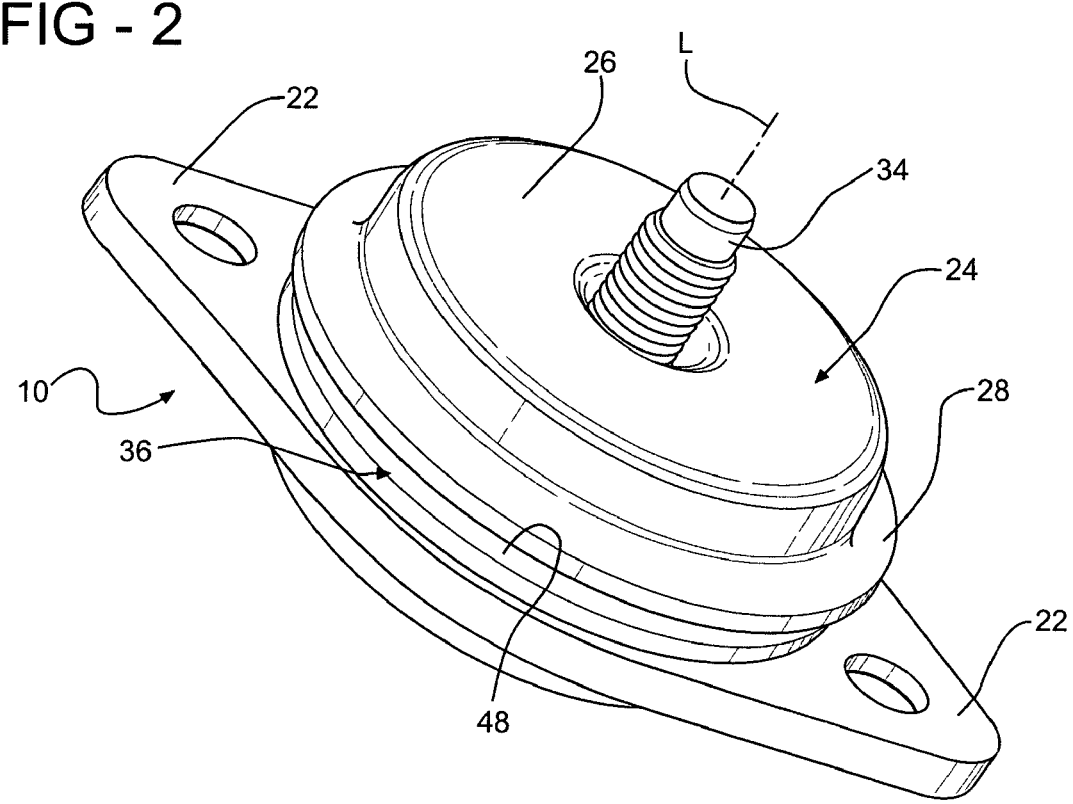
FIG. 2 is a perspective view of the mount assembly.

Referring to the Figures, wherein like numerals indicate like or corresponding parts throughout the several views, a mount assembly 10 in accordance with the subject invention is generally shown at 10 in FIGS. 1 and 2. The mount assembly 10 is shown in a rest state in FIG. 1. In the preferred embodiment, the mount assembly 10 is for use with a vehicle having a frame 12 and a vehicle body 14. For illustrative purposes, only a small fragment of the frame 12 and vehicle body 14 are shown in the Figures. The frame 12 and vehicle body 14 can be of any suitable design or configuration without deviating from the scope of the subject invention. In addition, it should be appreciated by those skilled in the art that the subject invention may be incorporated into different apparatuses and the subsequent discussion relating to a vehicle is but one contemplated environment for the invention.

The mount assembly 10 includes a support structure 16 having an aperture 18. The support structure 16 is preferably a piece of metal having pair of appendages 22. Of course the support structure 16 could be of any suitable design or configuration. The appendages 22 provide a mounting point such that the support structure 16 can be mounted to the frame 12 of the vehicle utilizing any suitable attachment device (not shown). The support structure 16 and frame 12 therefore move as a single unit. The purpose of the aperture 18 will be discussed in greater detail below.

A carrier 24 is at least partially disposed within the aperture 18 with the support structure 16 being displaceable relative to the carrier 24 along a line of travel L when the frame 12 moves relative to the vehicle body 14. The support structure 16 is displaceable relative to the carrier 24 in either a first $D_1$ or second $D_2$ direction. The first $D_1$ and second $D_2$ directions, as indicated by the arrows, are opposing directions along the line of travel L. It should be appreciated that the support structure 16 may be displaced angularly or perpendicularly relative to the line of travel L. It should also be appreciated that the nomenclature of the support structure 16 being displaced relative to carrier 24 is purely for descriptive purposes and, depending upon the point of reference, the carrier 24 could be displaced relative to the support structure 16.

The carrier 24 defines a cup 26 having a flange 28 extending outwardly therefrom and an inner wall 30 extending through the aperture 18 to a distal end. The inner wall 30 at least partially extends through the aperture 18. A plate 32 is mounted to the distal end of the inner wall 30. Specifically, a fastener 34 interconnects the plate 32 to the inner wall 30 such that the plate 32 and the carrier 24 move as a single unit. The fastener 34 is preferably a bolt with a nut wherein the nut is threaded onto the bolt on an opposing side of the vehicle body 14 such that the carrier 24 is mounted to the vehicle body 14. Accordingly, the carrier 24, plate 32, and fastener 34 move in unison with the movement of the vehicle body 14 relative to the frame 12 and support structure 16.

The carrier 24 is coupled to the support structure 16 to provide the necessary isolation and translation for the mount assembly 10. The coupling of the carrier 24 to the support structure 16 is provided through at least one and preferably a number of absorption elements 36, 38 which isolate small amplitude vibrations or displacements as well as translate intermittent high amplitude movements between the frame 12 and vehicle body 14 during and operation of the vehicle. The preferred absorption elements 36, 38 include first 36 and second 38 insulators.

In the preferred embodiment, the first insulator 36 is disposed between the support structure 16 and the carrier 24 for coupling the carrier 24 to the support structure 16. Hence, the first insulator 36 isolates and translates movements between the frame 12 and the vehicle body 14. Preferably, the first insulator 36 is mounted within the cup 26 of the carrier 24. The first insulator 36 is formed of an elastomeric material such as rubber or micro-cellular polyurethane. The micro-cellular polyurethane material is preferred but not required for the subject invention. The specific configuration and operation of the first insulator 36 will be discussed in greater detail below.

Also in the preferred embodiment, the second insulator 38 is mounted to the support structure 16 for further coupling the carrier 24 to the support structure 16 and for further isolating the displacement of the support structure 16 relative to the carrier 24 when a force is applied along the line of travel L. Hence, the second insulator 38 also isolates movements between the frame 12 and the vehicle body 14. Preferably, the second insulator 38 is disposed between the support structure 16 and the plate 32 below the first insulator 36. In other words, the second insulator 38 is positioned on an opposite side of the aperture 18 from the first insulator 36. The second insulator 38 is likewise formed of an elastomeric material such as rubber or micro-cellular polyurethane. The second insulator 38 has a substantially cylindrical configuration with an opening disposed therein for allowing the inner wall 30 of the carrier 24 to pass through the second insulator 38. The second insulator 38 and plate 32 have a complementary configuration and the second insulator 38 is wedged between the plate 32 and the support structure 16.

Figure 4:
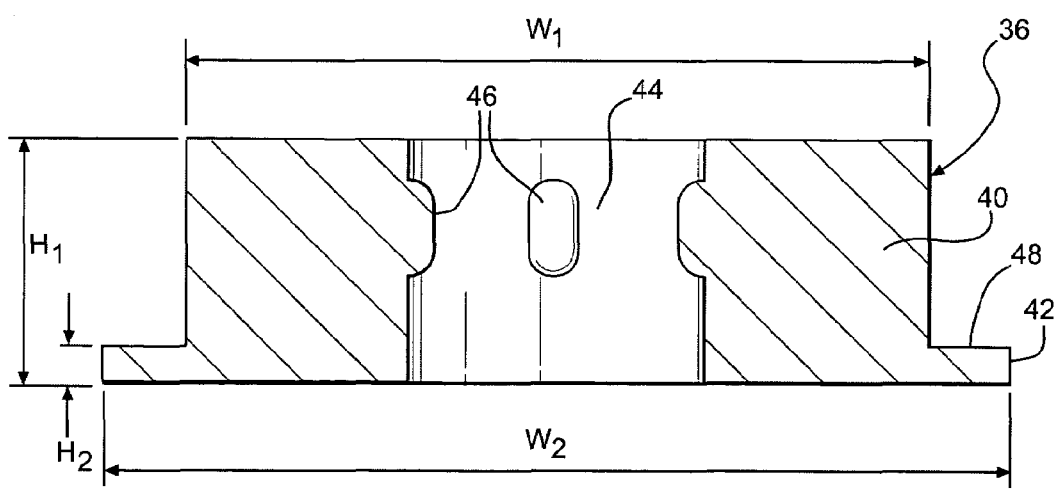
FIG. 4 is a cross-sectional view of the insulator of FIG. 3.
Figure 3:
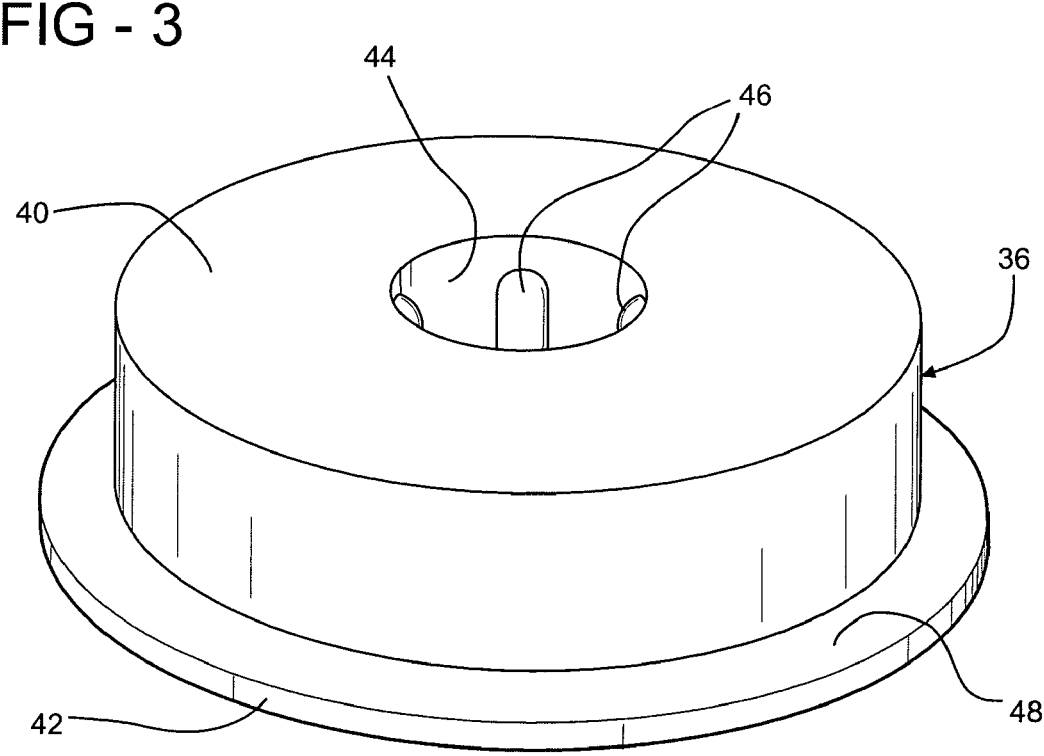
FIG. 3 is a perspective view of an insulator.

Referring also to FIGS. 3 and 4, the first insulator 36 is discussed in greater detail. The first insulator 36 has a first portion 40 and a second portion 42. Preferably, the first 40 and second 42 portions of the first insulator 36 are formed of the same material. More preferably, the first 40 and second 42 portions of the first insulator 36 are formed of a common homogeneous material. Most preferably, the common homogeneous material is further defined as a micro-cellular polyurethane. Both the first 40 and second 42 portions have a common opening 44. A plurality of abutments 46 project inwardly from the opening 44 and are configured to provide a press fit arrangement about the inner wall 30.

As best shown in FIG. 4, the first portion 40 of the first insulator 36 has a first maximum width $W_1$ and the second portion 42 of the first insulator 36 has a second maximum width $W_2$ which is larger than the first maximum width $W_1$. The support structure 16 has a width at least equal to the second maximum width $W_2$ to properly support the first insulator 36. The larger second maximum width $W_2$ of the second portion 42 defines a ledge 48 on the second portion 42 extending outwardly beyond the width $W_1$ of the first portion 40. In particular, as best shown in FIGS. 1 and 4, the first insulator 36 includes a base extending from the common opening 44 to the ledge 48. The base abuts the support structure 16 and is preferably substantially flat. As best shown in FIG. 3, the first portion 40 has an annular configuration defining a first circumference and the second portion 42 has an annular configuration defining a second circumference. The second circumference is larger than the first circumference to define an annular ledge 48 on the second portion 42 extending outwardly beyond the circumference of the first portion 40. The annular configuration of the first portion 40 allows for proper insertion into the first cup 26 of the carrier 24. It is also preferred that the first portion 40 and the second portion 42 having the annular ledge 48 are formed of a common homogeneous material, such as micro-cellular polyurethane.

In addition, as shown in FIG. 4, the first portion 40 has a first height $H_1$ and the second portion 42 has a second height $H_2$ smaller than the first height $H_1$. In particular, as shown, the first 40 and second 42 portions have a first height $H_1$ that is substantially uniform between the base and a top of the first portion 40. The second portion 42 has a second height $H_2$ that is substantially uniform between the base and a top of the ledge 48. Preferably, the first height $H_1$ is 3 to 5 times larger than the second height $H_2$. The first height $H_1$ can range from 10–50 mm and the second height $H_2$ can range from 2–10 mm. Of course, any suitable height of the first 40 and second 42 portions can be utilized depending upon the desired application.

Figure 5:
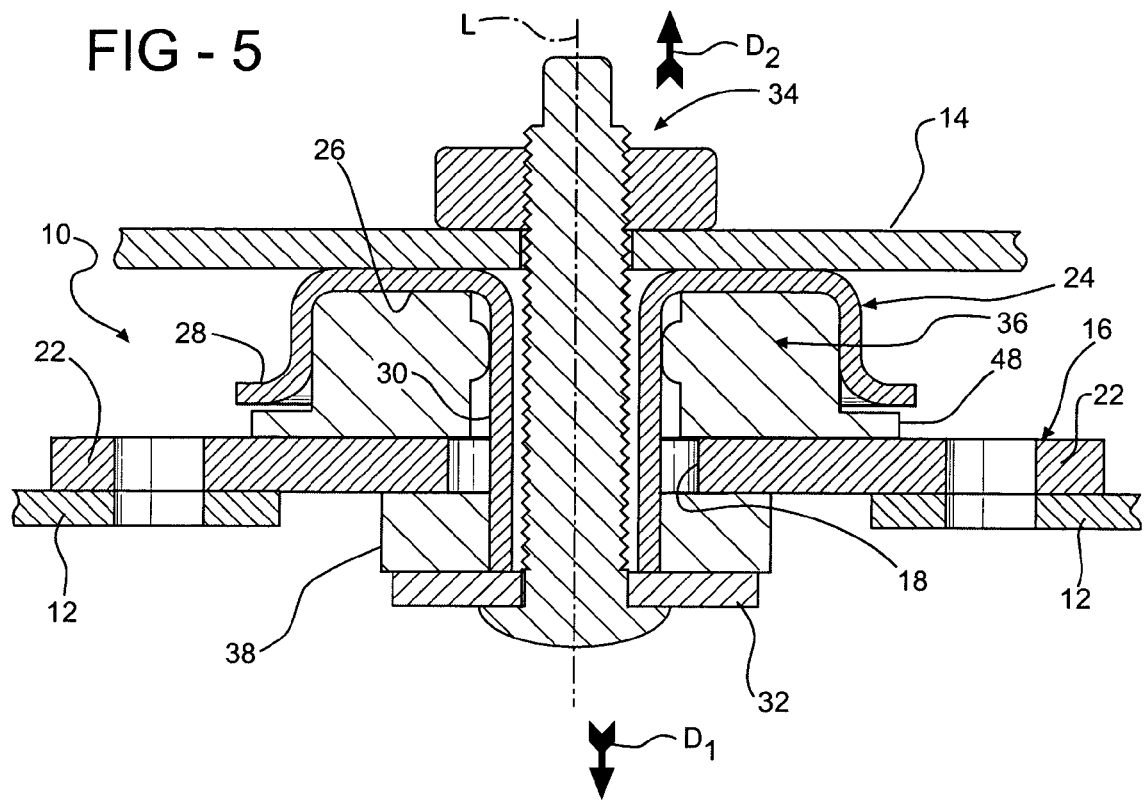
FIG. 5 is a cross-sectional side view of the mount assembly in a first state when a first force is applied.
Figure 6:
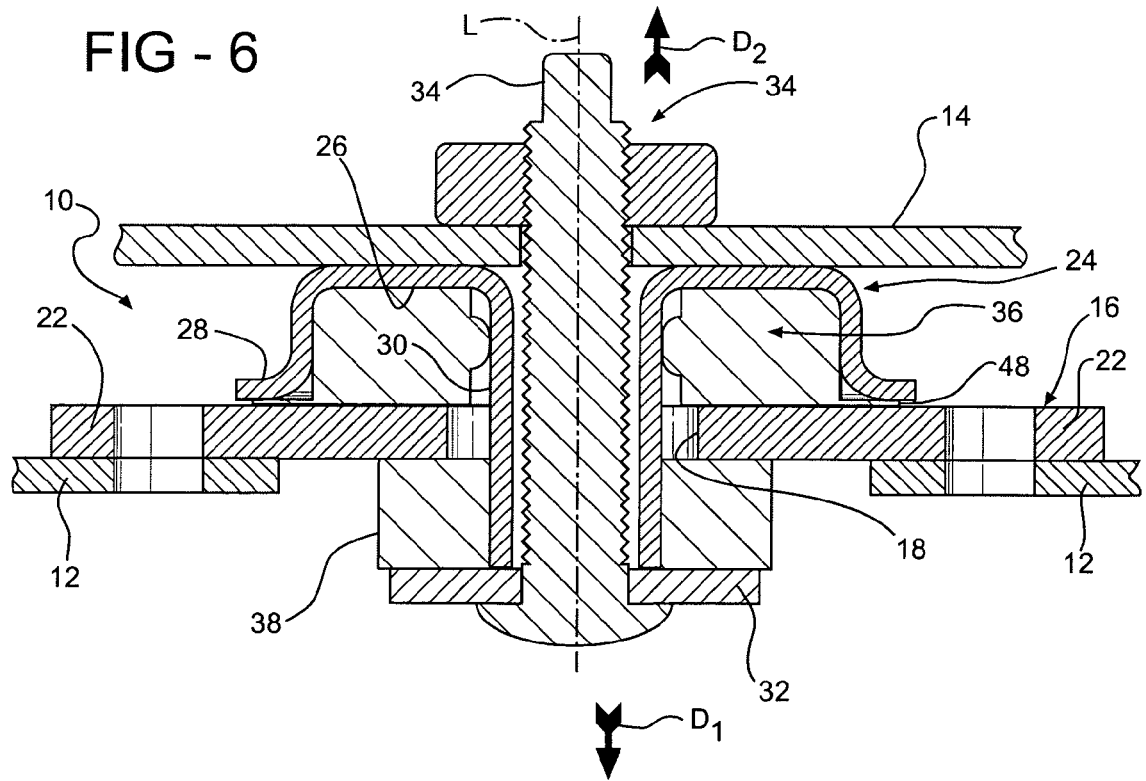
FIG. 6 is a cross-sectional side view of the mount assembly in a second state when a second force is applied.

Turning to FIGS. 5 and 6, the mount assembly 10 is shown in different operational positions. In particular, FIG. 5 illustrates the mount assembly 10 in a first state when a first force is applied. The assembly isolates vibrations of the support structure 16 relative to the carrier 24, e.g. movement of the frame 12 relative to the vehicle body 14. FIG. 6 illustrates the mount assembly 10 in a second state when a second force is applied. Here the assembly provides to control high amplitude of movements of the support structure 16 relative to the carrier 24, e.g. further movement of the frame 12 relative to the vehicle body 14. The details of how the isolation and translation occurs are discussed in greater detail below.

The first portion 40 of the first insulator 36 defines a first resistance for isolating the displacement of the support structure 16 relative to the carrier 24 during an application of the first force along the line of travel L in the first direction D, which at least partially compresses the first portion 40. The first force is also defined as a particular load which creates small amplitude vibrations or displacements of the support structure 16 relative to the carrier 24. Typical loads of the first force are less than 3 KN. The first portion 40 of the first insulator 36 is therefore designed to isolate these vibrational loads from the frame 12 and not translate these loads to the vehicle body 14. In the preferred embodiment, the cup 26 at least partially surrounds the first portion 40 and compresses the first portion 40 without compressing the ledge 48 and the second portion 42 when the first force is applied.

The second insulator 38 also isolates the vibration of the support structure 16 relative to the carrier 24 when the first force is applied along the line of travel L in the first direction $D_1$. The second insulator 38, however, expands as opposed to being compressed during an application of a force in the first direction $D_1$. The partial compression of the first portion 40 of the first insulator 36 and the expansion of the second insulator 38 are shown in FIG. 5. Although not illustrated, it is appreciated that the first portion 40 of the first insulator 36 will expand and the second insulator 38 will at least partially compress during an application of a force along the line of travel L in the second $D_2$ direction. Further, the first portion 40 of the first insulator 36 and the second insulator 38 may both partially expand and/or compress during an application of a force that is angularly or perpendicularly applied along the line of travel L.

The second portion 42 of the first insulator 36 defines a second resistance with the second resistance being greater than the first resistance for isolating and translating the displacement of the support structure 16 relative to the carrier 24 after the application of the first force and during an application of the second force along the line of travel L in the first direction $D_1$. The second force, which is also defined as a particular load, creates intermittent high amplitude movements of the support structure 16 relative to the carrier 24 and is greater than the first force such that both of the first 40 and second 42 portions are at least partially compressed. Typical loads of the second force range from 2–20 KN. The second portion 42 of the first insulator 36 is therefore designed to not only isolate but to also translate loads from the frame 12 to the vehicle body 14. This creates optimum vehicle control by translating the low frequency and large displacement loads. In the preferred embodiment, the flange 28, extending outwardly from the cup 26, engages and compresses against the ledge 48 of the second portion 42 during the application of the second force. In other words, the first 40 and second 42 portions of the first insulator 36 are significantly compressed which wedges the ledge 48 in-between the flange 28 of the carrier 24 and the support structure 16.

The second insulator 38 also isolates the displacement of the carrier 24 relative to the support structure 16 when the second force is applied along the line of travel L in the first direction $D_1$. As stated above, the second insulator 38 expands as opposed to being compressed during the application of a force in the first direction $D_1$. The compression of both the first 40 and second 42 portions of the first insulator 36 and expansion of the second insulator 38 is shown in FIG. 6. Due to the preferred configuration of the mount assembly 10, the first portion 40 at least partially compresses before the second portion 42 is at least partially compresses.

The first insulator 36 therefore provides a resistance for isolating small amplitude vibrations or movements of the frame 12 relative to the vehicle body 14. Turning to FIG. 7, the amount of maximum displacement of the support structure 16 relative to the carrier 24, or the frame 12 relative to the vehicle body 14, for a variety of loads is illustrated. Rubber R has a relatively uniform displacement for the increased loads. It is advantageous, however, to vary the spring rate such that during the small amplitude vibrations or displacements of the support structure 16 relative to the carrier 24, the insulators isolate the movement of the frame 12 relative to the vehicle body 14. The first resistance associated with the first portion 40 of the first insulator 36 and the second insulator 38 of the subject assembly preferably provide full isolation of the support structure 16 relative to the carrier 24 up to a 3,000 N load. After the 3,000 N load, the flange 28 of the carrier 24 engages the ledge 48 of the second portion 42. There is a smooth transition into the second resistance of the second portion 42. From the 3,000 N load to the 10,000 N load, the first 40 and second 42 portions of the first insulator 36 and the second insulator 38 effectively control the displacement of the support structure 16 (frame 12) relative to the carrier 24 (vehicle body 14). As illustrated, the displacement is reduced when the height $H_2$ of the ledge 48 is increased. In the example shown, there is approximately 11 mm of displacement when the height $H_2$ of the ledge 48 is 3 mm. Alternatively, there is approximately 9 mm of displacement when the height $H_2$ of the ledge 48 is increased to 6 mm.

The ability to change the heights of the first 40 and second 42 portions of the first insulator 36, as well as the cup depth, the first insulator 36 can be easily customized to a desired performance for any type of vehicle. In other words, the subject invention provides for improved flexibility and the ability to "tune" the assembly. In particular, the widths and heights of the first 40 and second 42 portions can be "tuned" to any desired combination of isolation and displacement control characteristics. The prior art urethane insulator cannot be "tuned" because this insulator does not include first and second portions as defined by the subject invention. The first insulator 36 also provides for a continuous isolation of vibration between the frame 12 and the vehicle body 14 and a smooth transition from the first resistance to the second resistance.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

The invention claimed is:

1. A mount assembly for use with a vehicle having a frame and a vehicle body, said mount assembly comprising:

a support structure having an aperture and adapted to be mounted to the frame of the vehicle;

a carrier adapted to be mounted to the vehicle body and at least partially disposed within said aperture with said support structure being displaceable relative to said carrier along a line of travel when the frame moves relative to the vehicle body; and an insulator disposed between said support structure and said carrier for coupling said carrier to said support structure;

said insulator having a first portion defining a first resistance and a first maximum width for isolating said displacement of said support structure during an application of a first force along said line of travel in a first direction which at least partially compresses said first portion, and a second portion defining a second resistance and a second maximum width with said second resistance being greater than said first resistance for isolating and translating said displacement of said support structure after said application of said first force and during an application of a second force along said line of travel in said first direction wherein said second force is greater than said first force such that both of said first and second portions are at least partially compressed and said second width being larger than said first width to define a ledge on said second portion extending outwardly beyond said width of said first portion, said insulator defining an opening through said first and second portions and a base extending from said openings to said ledge with said base being substantially flat relative to said support structure and abutting said support structure for ensuring that said first and second portions are properly compressed during said applications of said forces, said first and second portions having a first height that is substantially uniform between said base and a top of said first portion, and said second portion having a second height that is substantially uniform between said base and a top of said ledge for allowing said first and second portions to be compressed uniformly during said applications of said forces, said second height of said second portion being smaller than said first height of said first and second portions;

said carrier defining a cup at least partially surrounding said first portion and compressing said uniform first height of said first and second portions without compressing said ledge and said second portion when said first force is applied with said cup including a flange spaced from said ledge during said application of said first force and engaging and compressing against said uniform second height of said ledge during said application of said second force.

2. The assembly as set forth in claim 1 wherein said first portion is at least partially compressed before said second portion is at least partially compressed.

3. The assembly as set forth in claim 1 wherein said first and second portions of said insulator are formed of the same material.

4. The assembly as set forth in claim 1 wherein said first and second portions of said insulator are formed of a common homogeneous material.

5. The assembly as set forth in claim 4 wherein said common homogeneous material is further defined as microcellular polyurethane.

6. The assembly as set forth in claim 1 wherein said first height is 3 times larger than said second height.

7. The assembly as set forth in claim 1 wherein said first maximum width of said first portion defines a first outer peripheral surface of said insulator and said second maximum width of said second portion defines a second outer peripheral surface of said insulator that is parallel to said first outer peripheral surface with said first outer peripheral surface intersecting said ledge of said second portion for further ensuring that said first and second portions are uniformly compressed during said applications of said forces.

8. The assembly as set forth in claim 1 wherein said flange extends outwardly from said cup over said ledge for engaging and compressing against said ledge during said application of said second force.

9. The assembly as set forth in claim 7 wherein said first outer peripheral surface of said first portion has an annular configuration defining a first circumference.

10. The assembly as set forth in claim 9 wherein said second outer peripheral surface of said second portion has an annular configuration defining a second circumference which is larger than said first circumference to define an annular ledge on said second portion extending outwardly beyond said circumference of said first portion.

11. The assembly as set forth in claim 10 wherein said first portion and said second portion having said annular ledge are formed of a common homogeneous material.

12. The assembly as set forth in claim 8 wherein said cup further includes an inner wall extending through said aperture to a distal end.

13. The assembly as set forth in claim 12 wherein said inner wall of said cup at least partially extends through said aperture.

14. The assembly as set forth in claim 13 further including a plate mounted to said distal end of said inner wall.

15. The assembly as set forth in claim 14 further including a fastener interconnecting said plate to said inner wall such that said plate and said carrier move as a single unit.

16. The assembly as set forth in claim 14 further including a second insulator for further coupling said carrier to said support structure and for further isolating said displacement of said carrier when said first and second forces are applied along said line of travel.

17. The assembly as set forth in claim 16 wherein said second insulator is disposed between said support structure and said plate.

18. An insulator for a mount assembly of a vehicle having a frame and a vehicle body wherein the mount assembly includes a support structure mounted to the frame and a carrier mounted to the vehicle body with the support structure having a flange and being displaceable relative to the carrier along a line of travel when the frame moves relative to the vehicle body and said insulator disposed between the support structure and the carrier for coupling the carrier to the support structure, said insulator comprising:

a first portion defining a first resistance and a first maximum width for isolating the displacement of the support structure during an application of a first force along the line of travel in a first direction which at least partially compresses said first portion; and a second portion defining a second resistance and a second maximum width with said second resistance being greater than said first resistance for isolating and translating the displacement of the support structure after the application of the first force and during an application of a second force along the line of travel in the first direction wherein the second force is greater than the first force such that both of said first and second portions are at least partially compressed and with said second width being larger than said first width to define a ledge on said second portion extending outwardly beyond said width of said first portion;

said first and second portions being formed of microcellular polyurethane;

said first and second portions each defining an opening therein and said second portion having a base extending from said openings to said ledge with said base being substantially flat relative to said support structure and abutting said support structure for ensuring that said first and second portions are properly compressed during said applications of said forces;

said first and second portions having a first height that is substantially uniform between said base and a top of said first portion with said top of said first portion configured to be contiguous with the carrier, and said second portion having a second height that is substantially uniform between said base and a top of said ledge with said ledge configured to be positioned below the flange of the support structure for allowing said first and second portions to be compressed uniformly during the application of the forces; and said first height being at least 3 times larger than said second height for preventing said ledge from being compressed during the application of the first force.

19. The insulator as set forth in claim 18 wherein said first portion is at least partially compressed before said second portion is at least partially compressed.

20. The insulator as set forth in claim 18 wherein said first and second portions are formed of the same material.

21. The insulator as set forth in claim 18 wherein said first and second portions are formed of a common homogeneous material.

22. The assembly as set forth in claim 18 wherein said first maximum width of said first portion defines a first outer peripheral surface of said insulator and said second maximum width of said second portion defines a second outer peripheral surface of said insulator that is parallel to said first outer peripheral surface with said first outer peripheral surface intersecting said ledge of said second portion for further ensuring that said first and second portions are uniformly compressed during the application of the forces.

23. The insulator as set forth in claim 22 wherein said first outer peripheral surface of said first portion has an annular configuration defining a first circumference.

24. The insulator as set forth in claim 23 wherein said second outer peripheral surface of said second portion has an annular configuration defining a second circumference which is larger than said first circumference to define an annular ledge on said second portion extending outwardly beyond said circumference of said first portion.

25. The insulator as set forth in claim 24 wherein said first portion and said second portion having said annular ledge are formed of a common homogeneous material.

* * * * *